(12) United States Patent
Gartenmaier et al.

(10) Patent No.: US 9,027,663 B2
(45) Date of Patent: May 12, 2015

(54) LINKAGE ARRANGEMENT

(75) Inventors: Markus Gartenmaier, Regensburg (DE); Bernhard Eckl, Schwarzenfeld (DE); Antoniu Nopcea, Regensburg (DE); Zdenko Savsek, Trbovlje (SI)

(73) Assignee: Caterpillar Inc., Peoria, IL (US)

( * ) Notice: Subject to any disclaimer, the term of this patent is extended or adjusted under 35 U.S.C. 154(b) by 25 days.

(21) Appl. No.: 13/989,417

(22) PCT Filed: Dec. 14, 2011

(86) PCT No.: PCT/EP2011/006311
§ 371 (c)(1),
(2), (4) Date: Jul. 29, 2013

(87) PCT Pub. No.: WO2012/079754
PCT Pub. Date: Jun. 21, 2012

(65) Prior Publication Data
US 2013/0298728 A1 Nov. 14, 2013

(30) Foreign Application Priority Data
Dec. 14, 2010 (EP) .................................. 10015612

(51) Int. Cl.
*A01B 31/00* (2006.01)
*F16H 21/44* (2006.01)
(Continued)

(52) U.S. Cl.
CPC .............. *F16H 21/44* (2013.01); *E02F 3/7622* (2013.01); *E02F 9/085* (2013.01)

(58) Field of Classification Search
USPC ...................... 172/307, 417, 484, 464, 624.5, 172/810–812, 814, 815, 817–819, 172/824–828; 37/196, 231, 214
See application file for complete search history.

(56) References Cited

U.S. PATENT DOCUMENTS 3,032,903 A 5/1962 Ede
3,382,995 A 5/1968 Strader
(Continued)

FOREIGN PATENT DOCUMENTS

CN 101892680 A 11/2010
DE 93 19 939.2 3/1994
(Continued)

OTHER PUBLICATIONS

English-language International Search Report from European Patent Office for International Application No. PCT/EP2011/006311, mailed Mar. 22, 2012.
(Continued)

*Primary Examiner* — Robert Pezzuto
(74) *Attorney, Agent, or Firm* — Finnegan, Henderson, Farabow, Garrett & Dunner, LLP

(57) ABSTRACT

A linkage arrangement (10) is provided for moveably connecting an attachment (6) to a work machine (8). The linkage arrangement (10) includes linkage group (12) having an upper arm (14) with a machine pivot point (20) for connecting to the work machine (8) and an attachment pivot point (22) for connecting to the attachment (6). The linkage group (12) further has a lower arm (16) with a machine pivot point (24) for connecting to the work machine (8) and an attachment pivot point (26) for connecting to the attachment (6). An actuator (30) extends between the upper and lower arms (14, 16), whereby during normal operation an increase in the length of the actuator (30) results in the attachment (6) being lowered relative to the work machine (8).

14 Claims, 4 Drawing Sheets

(51) Int. Cl.
*E02F 3/76* (2006.01)
*E02F 9/08* (2006.01)

(56) References Cited

U.S. PATENT DOCUMENTS

| | | | |
|---|---|---|---|
| 3,581,827 A | | 6/1971 | Ratcliff |
| 3,592,273 A | * | 7/1971 | Martin .......................... 172/373 |
| 4,081,035 A | * | 3/1978 | Bowen .......................... 172/484 |
| 4,103,443 A | * | 8/1978 | Pelsy .............................. 37/370 |
| 4,127,951 A | | 12/1978 | Hatch |
| 4,351,397 A | | 9/1982 | Winker |
| 4,858,698 A | | 8/1989 | Williamson et al. |
| 5,901,793 A | | 5/1999 | Frisbee |
| 2002/0150453 A1 | | 10/2002 | Hedley et al. |
| 2009/0199441 A1 | | 8/2009 | Jorgensen et al. |

FOREIGN PATENT DOCUMENTS

| | | |
|---|---|---|
| FR | 1.308.449 | 11/1962 |
| FR | 1.410.186 | 9/1965 |
| GB | 2 172 037 | 9/1986 |

OTHER PUBLICATIONS

English-language European Search Report from the Munich Patent Office for EP 10 19 5312, date of completion of search May 6, 2011.

* cited by examiner

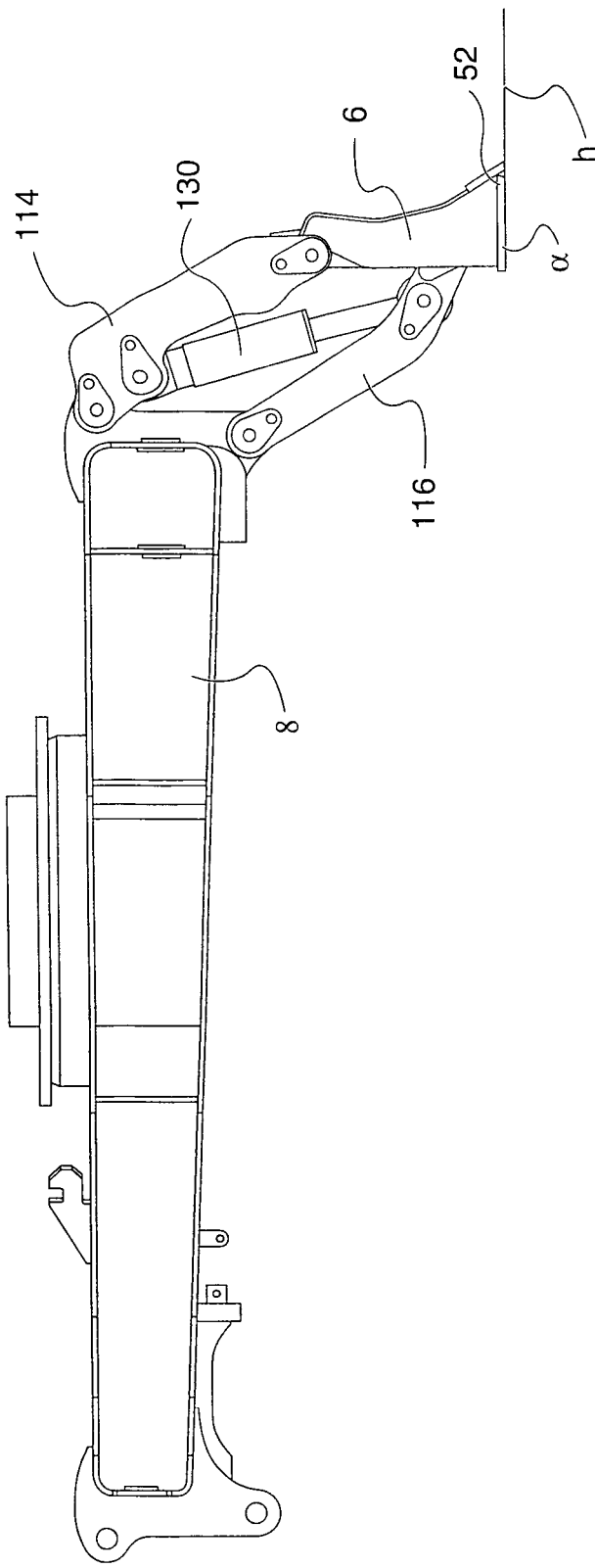

LINKAGE ARRANGEMENT

TECHNICAL FIELD

The present disclosure relates generally to a linkage arrangement for moveably connecting an attachment to a work machine.

BACKGROUND

Linkage arrangements are used to moveably connect attachments to machines such as excavators and the like. One such linkage arrangement is for example know from U.S. Pat. No. 3,581,827. Further linkage arrangements are known from FR 1 308 449 A, GB 2 172 037 A and U.S. Pat. No. 4,858,698. Such linkage arrangements may have some drawbacks in for example the kinematics it exhibits or the manner of attachment to the machine. The current disclosure is aimed at providing an alternative linkage arrangement.

SUMMARY

In a first aspect of the disclosure there is provided a linkage arrangement for moveably connecting an attachment to a work machine. The linkage arrangement comprises a first linkage group having an upper arm with a machine pivot point for connecting to the work machine and an attachment pivot point for connecting to the attachment. The first linkage group further has a lower arm with a machine pivot point for connecting to the work machine and an attachment pivot point for connecting to the attachment. The linkage arrangement further includes a variable length actuator extending between the upper and lower arms, whereby during normal operation an increase in the length of the actuator results in the attachment being lowered relative to the work machine.

In a second aspect there is provided a method of moving an attachment relative to a machine using a linkage arrangement, the linkage arrangement having an upper arm with pivots connecting the upper arm to the machine and the attachment, and a lower arm with pivots connecting the lower arm to the machine and the attachment. The method comprises increasing a distance between a pivot point of the upper arm and a pivot point of the lower arm by actuating a variable length actuator to provide an active force on one of the upper and lower arms and an opposing reactive force on the other of the upper and lower arms, whereby during normal operation an increase in the length of the actuator results in the attachment being lowered relative to the work machine.

BRIEF DESCRIPTION OF THE DRAWINGS

FIG. 3b is a schematic illustration of a side view of the exemplary linkage arrangement of FIG. 1 with the attachment in a lowered position;

DETAILED DESCRIPTION

Figure 1:
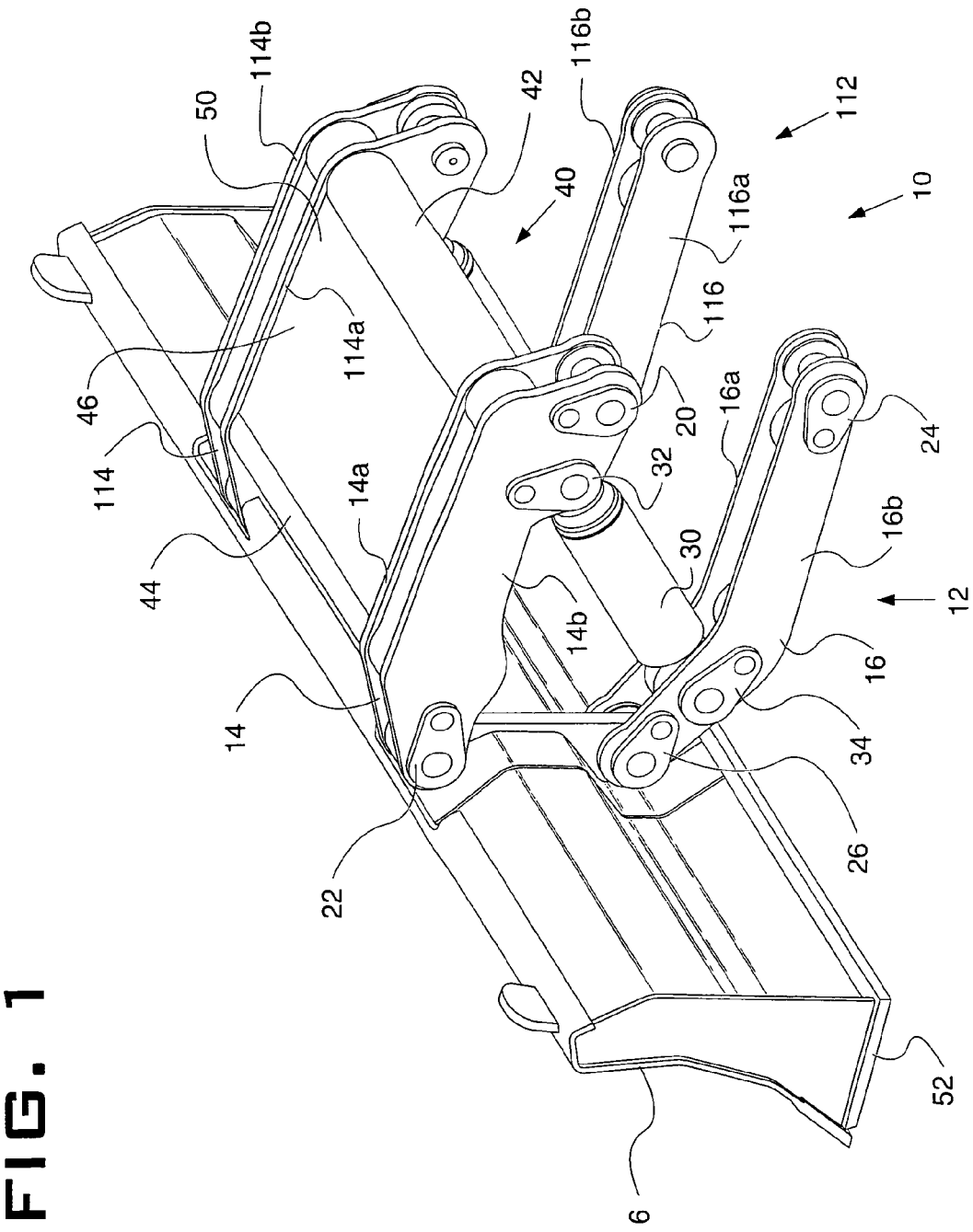
FIG. 1 is a schematic illustration of an exemplary linkage arrangement in a first isometric view.

FIG. 1 is a schematic illustration of an exemplary embodiment of a linkage arrangement 10 suitable to moveably connect an attachment 6 to a machine. The machine may be any machine that could benefit from using the linkage arrangement 10 and could for example be a construction machine such as a wheeled excavator. For clarity, only a portion of the machine is shown in the figures and will be referred to as machine 8. The linkage arrangement 10 may include a first linkage group 12, a second linkage group 112, a first actuator 30 and a second actuator 130. The first and second linkage groups 12 and 112 and the first and second first actuators 30 and 130 may be substantially similar and like numerals indicate like components. It is to be understood that the first and second linkage groups 12 and 112, and the first and second actuators 30 and 130 may of course include differences that do not substantially affect the operation in accordance with this disclosure. For brevity sake only the first linkage group 12 and the first actuator 30 will be discussed in further detail.

The first linkage group 12 may include an upper arm 14 and a lower arm 16. The upper arm 14 may be of either a single or dual wall construction, the embodiment shown in FIGS. 1 and 2 being of the dual wall type including an inner wall 14a and an outer wall 14b. The lower arm 16 may be of either a single or dual wall construction, the embodiment shown in FIGS. 1 and 2 being of the dual wall type including an inner wall 16a and an outer wall 16b.

The upper arm 14 may be provided with a machine pivot point 20 to connect the upper arm 14 with the machine 8. The upper arm 14 may further be provided with an attachment pivot point 22 to connect the upper arm 14 with the attachment 6. The lower arm 16 may be provided with a machine pivot point 24 to connect the lower arm 16 with the machine 8. The lower arm 16 may further be provided with an attachment pivot point 26 to connect the lower arm 16 with the attachment 6.

The first actuator 30 extends between the upper arm 14 and the lower arm 16. The first actuator 30 may be an actuator with a variable length such as for example an extendable actuator like a hydraulic ram. The first actuator 30 may have an upper pivot point 32 to connect the first actuator 30 to the upper arm 14. The upper pivot point 32 is generally located between the machine pivot point 20 and the attachment pivot point 22. The first actuator 30 may have a lower pivot point 34 to connect the first actuator 30 to the lower arm. The lower pivot point 34 is generally located between the machine pivot point 24 and the attachment pivot point 26. In a first kinematical orientation the upper pivot point 32 may be located closer to the machine pivot point 20 than to the attachment pivot point 22. In other words, the upper pivot point may be adjacent to the machine pivot point 20 of the upper arm 14. In that first kinematical orientation the lower pivot point 34 may then be located adjacent to the attachment pivot point 26 of the lower arm 16. In a second kinematical orientation the upper pivot point 32 may be located adjacent to the attachment pivot point 22 of the upper arm 14. In that second kinematical orientation the lower pivot point 34 may be located adjacent to the machine pivot point 24 of the lower arm 16. The exemplary embodiment of FIGS. 1 and 2 show the first kinematical orientation.

The portions of the first actuator 30 that at least partially form the pivot points 32 and 34 may be adapted according to the shape of the upper and lower arms 14 and 16 respectively. If for example the upper arm 14 is of a dual wall construction, the first actuator 30 may be shaped to have a portion that is at least partially positioned between the two walls 14a and 14b. If in another embodiment the upper wall is for example of a single wall construction, the end portion of the first actuator 30 may by generally U-shaped such that the upper arm 14 is at least partially positioned between the walls of the U-shape.

Figure 2:
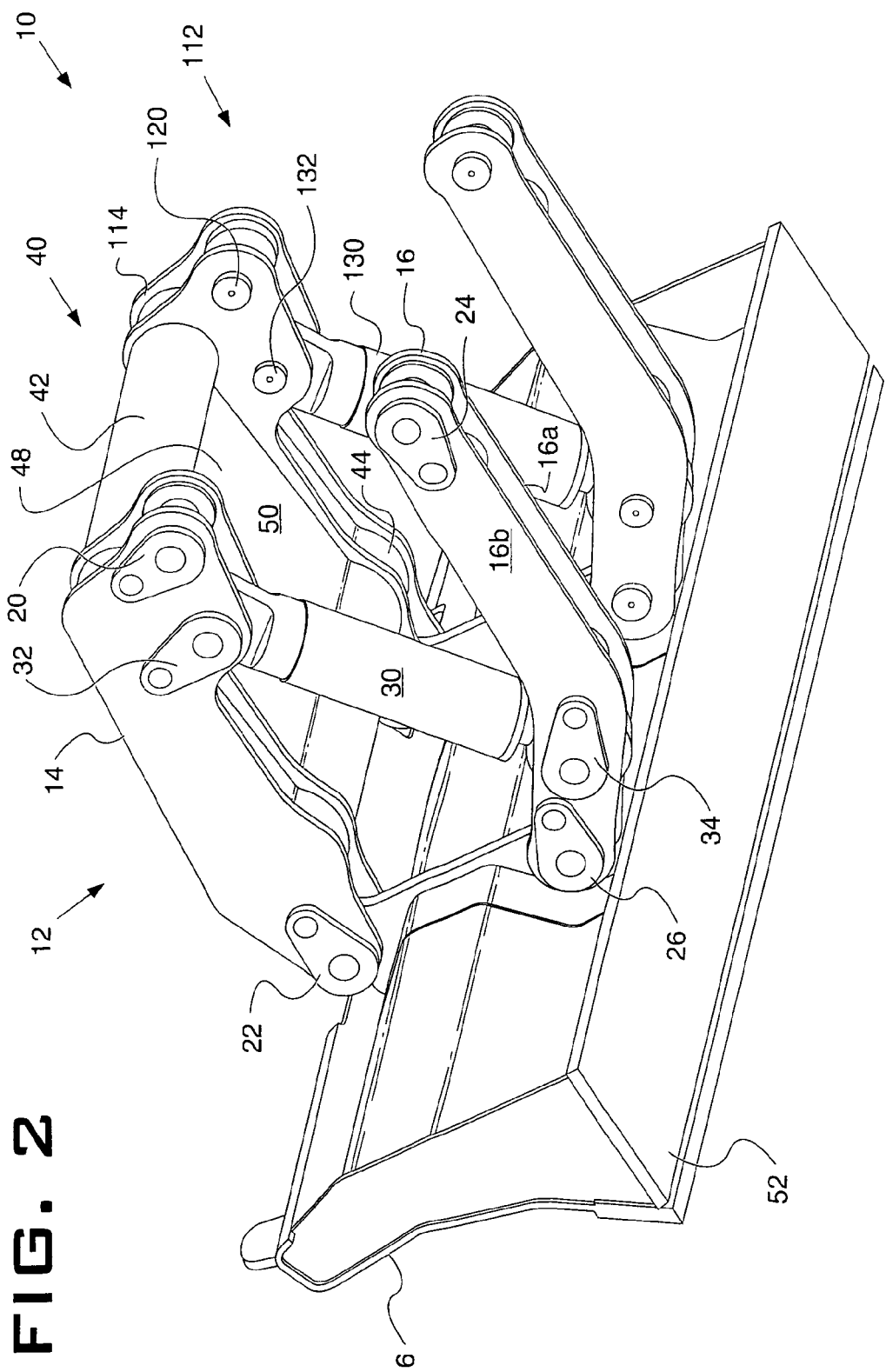
FIG. 2 is a schematic illustration of the exemplary linkage arrangement of FIG. 1 in a second isometric view.

All the pivot points 20, 22, 24, 26, 32 and 34 may be of the construction shown in the exemplary embodiment of FIGS. 1 and 2, i.e. flanged pins. However, any other suitable mounting arrangement allowing the required movement may be employed.

As referred to above, the linkage arrangement 10 may include first and second linkage groups 12 and 112. The first and second linkage groups 12 and 112 may be connected via a support structure 40 extending between the first and second linkage groups 12 and 112. The support structure 40 may include a first support element 42 extending between the upper arms 14 and 114. The support structure 40 may further include a second support element 44 extending between the upper arms 14 and 114. The first and second support elements 42 and 44 may for example be solid members, tubular structures or generally U- or V-shaped sections. The support structure 40 may include one or more generally plate shaped elements like the first plate member 46 and/or second plate member 48 as shown in FIGS. 1 and 2. The first and second plate members 46 and 48 do not have to be identical in structure or mounting arrangements, but may of course share similar features or be substantially identical. The first and second plate members 46 and 48 may be connected to at least one of the support members 42 and 44. The first and second plate members 46 and 48 may also, or alternatively, be connected to at least one of the upper arms 14 and 114. In the exemplary embodiment of FIGS. 1 and 2, both the first and second plate members 46 and 48 are connected to both the support members 42 and 44 as well as to both the upper arms 14 and 114 to form a box section 50. In the exemplary embodiment of FIGS. 1 and 2 the first and second plate members 46 and 48 are constructed as solid plates and substantially fully welded to the support members 42 and 44 and the upper arms 14 and 114. If preferred, the first and second plate members 46 and 48 may be provided with perforations and/or apertures and/or may only be partially welded.

Depending on the structure of the upper arms 14 and 114, the support structure 40 or elements thereof may be connected to the single walls of upper arms 14 and 114 or to either a single or both walls 14a, 14b, 114a, 114b of the upper arms 14 and 114 where the upper arms 14 and 114 are of a dual wall construction.

INDUSTRIAL APPLICABILITY

During normal operation the linkage arrangement 10 is connected between the attachment 6 and the machine 8 to generally form a parallelogram with the pivot points 20, 22, 24 and 26 being located on the corners of the parallelogram. Varying the length of the actuators 30 and 130 provides an active force on one of the upper and lower arms 14, 16, 114, 116 and an opposing reactive force on the other of the upper and lower arms 14, 16, 114, 116 causing the attachment to move relative to the machine 8. In the first kinematical orientation as shown in FIGS. 1 and 2 an extension of the actuators 30 and 130 results in the attachment 6 being lowered relative to the machine 8. Reducing the length of the actuators 30 and 130 causes the attachment 6 to be raised relative to the machine 8. Generally three conditions may be achieved with this arrangement. In a first scenario the attachment 6 is raised from the surface altogether. In a second scenario both the attachment 6 and the wheels of the machine 8 make contact with the surface. This second scenario may be regarded as a dozing/leveling operation and may be represented by FIG. 3b. In the third scenario at least some of the wheels are raised of the surface whilst the attachment 6 makes contact with the surface. This third scenario may be regarded as a stabilizing operation, e.g. for digging purposes, and may be represented by FIG. 3b. Of course intermediate positions may be available as the linkage arrangement 10 may provide an infinite number of positions.

Figure 3A:
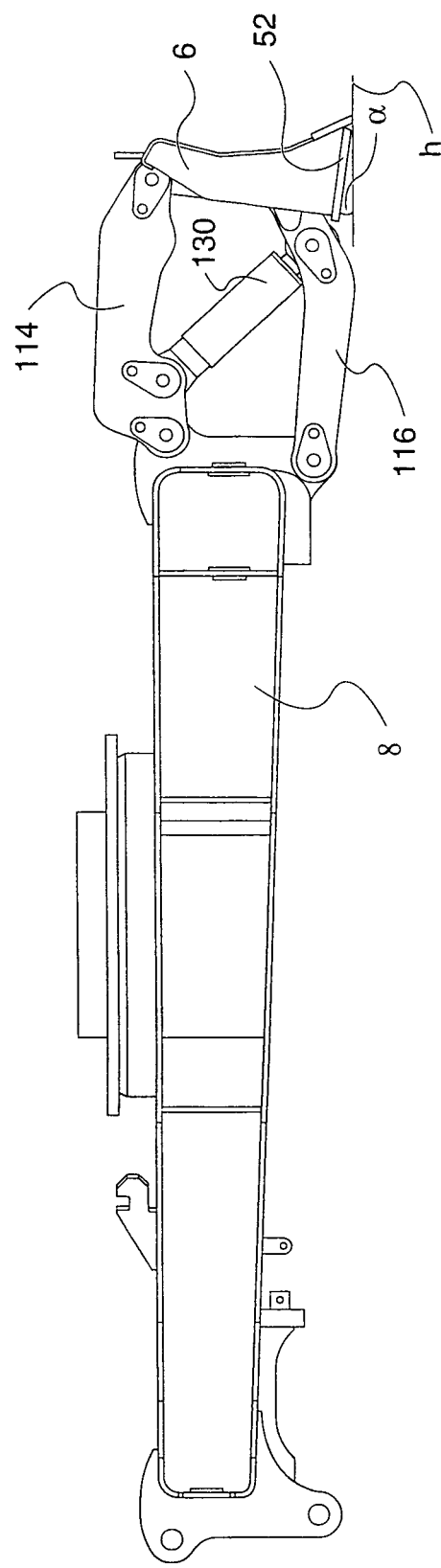
FIG. 3a is a schematic illustration of a side view of the exemplary linkage arrangement of FIG. 1 with the attachment in a raised position.

Now further referring to FIGS. 3a and 3b, in one embodiment the kinematics of the linkage arrangement 10 may allow for a change in orientation of the attachment 6 during its descend. The attachment may for example be a combined dozer blade and stabilizer having a footplate 52. It may be beneficial for the footplate 52 to have different rake angles α for dozing and for stabilizing. The rake angle α in this context is defined as the angle between the footplate 52 and the horizontal (h). It is to be understood that the rake angle α as shown in FIG. 3a is an example of a positive rake angle and the rake angle α of FIG. 3b is a zero or near-zero rake angle. It follows that any negative rake angle α would then sit below the horizontal (h). In one embodiment operations with the attachment 6 in dozing/leveling position may benefit from a positive rake angle α so as to achieve good dozer self-cleaning capability. In one embodiment operations with the attachment 6 in a dozing/leveling position the attachment 6 may benefit from a zero or near-zero rake angle α so as to achieve a good cut and leveling from the footplate 52.

In one embodiment for stabilizing the machine 8 it may be desirable to have a reduced rake angle α so as to achieve a flat and stable contact between the footplate and the ground surface. In one embodiment it may be beneficial for the machine 8 to be stabilized with the footplate 52 having a negative rake angle so as to achieve an embedded contact between the footplate 52 and the ground surface.

It will be apparent to those skilled in the art that various modifications and variations can be made in the disclosed linkage arrangement. Other embodiments will be apparent to those skilled in the art from consideration of the specification and practice of the disclosed embodiments herein. It is intended that the specification and examples be considered as exemplary only, with a true scope of the disclosure being indicated by the attached claims.

The invention claimed is:

1. A linkage arrangement for moveably connecting an attachment to a machine, said linkage arrangement comprising:
    a first linkage group having an upper arm with a machine pivot point for connecting to the machine and an attachment pivot point for connecting to the attachment, and a lower arm with a machine pivot point for connecting to the machine and an attachment pivot point for connecting to the attachment;
    a variable length actuator extending between the upper and lower arms, the variable length actuator being configured such that during normal operation an increase in the length of the actuator results in the attachment being lowered relative to the machine;
    wherein at least one of the upper arm and the lower arm has a dual wall construction and wherein at least a portion of the actuator is positioned between the two walls of the dual wall construction.

2. A linkage arrangement according to claim 1, wherein the actuator has
    a) an upper pivot point generally located between the machine and attachment pivot points of the upper arm, and
    b) a lower pivot point generally located between the machine and attachment pivot points of the lower arm.

3. A linkage arrangement according to claim 2, wherein the upper pivot point of the actuator is located adjacent the machine pivot point of the upper arm.

4. A linkage arrangement according to claim 2, wherein the lower pivot point of the actuator is located adjacent the attachment pivot point of the lower arm.

5. A linkage arrangement according to claim 1, further comprising a second linkage group substantially similar to the first linkage group, the first and second linkage groups being connected via a support structure extending between the first and second linkage groups.

6. A linkage arrangement for moveably connecting an attachment to a machine, said linkage arrangement comprising:
   a first linkage group having an upper arm with a machine pivot point for connecting to the machine and an attachment pivot point for connecting to the attachment, and a lower arm with a machine pivot point for connecting to the machine and an attachment pivot point for connecting to the attachment;
   a variable length actuator extending between the upper and lower arms, and configured such that during normal operation an increase in the length of the actuator results in the attachment being lowered relative to the machine;
   a second linkage group substantially similar to the first linkage group, the first and second linkage groups being connected via a support structure extending between the first and second linkage groups,
   wherein the support structure comprises at least first and second tubular elements extending between upper arms of the first and second linkage groups.

7. A linkage arrangement according to claim 6, wherein two plate members are connected to the first and second tubular elements and the upper arms of the first and second linkage groups to form a box section.

8. A linkage arrangement according to claim 6, wherein at least one plate member is connected to the first and second tubular elements and upper arms of the first and second linkage groups.

9. An attachment configured for coupling to a machine via a linkage arrangement, the linkage arrangement including:
   a first linkage group including an upper arm with a machine pivot point for connecting to the machine and an attachment pivot point for connecting to the attachment, and a lower arm with a machine pivot point for connecting to the machine and an attachment pivot point for connecting to the attachment; and
   a variable length actuator extending between the upper and lower arms and configured such that during normal operation an increase in the length of the actuator results in the attachment being lowered relative to the machine;
   wherein the attachment includes a foot plate with a rake angle that changes during raising and lowering, wherein the rake angle decreases during lowering of the attachment relative to the machine due to the kinematics of the linkage arrangement, and wherein at least one of the upper arm and the lower arm has a dual wall construction and wherein at least a portion of the actuator is positioned between the two walls of the dual wall construction.

10. The attachment of claim 9, wherein the variable length actuator includes:
   a) an upper pivot point generally located between the machine and attachment pivot points of the upper arm, and
   b) a lower pivot point generally located between the machine and attachment pivot points of the lower arm.

11. The attachment of claim 10, wherein the upper pivot point of the actuator is located adjacent the machine pivot point of the upper arm.

12. The attachment of claim 10, wherein the lower pivot point of the actuator is located adjacent the attachment pivot point of the lower arm.

13. The attachment of claim 9, wherein the linkage arrangement further includes a second linkage group substantially similar to the first linkage group, the first and second linkage groups being connected via a support structure extending between the first and second linkage groups.

14. An attachment configured for coupling to a machine via a linkage arrangement, the linkage arrangement including:
   a first linkage group including an upper arm with a machine pivot point for connecting to the machine and an attachment pivot point for connecting to the attachment, and a lower arm with a machine pivot point for connecting to the machine and an attachment pivot point for connecting to the attachment;
   a variable length actuator extending between the upper and lower arms and configured such that during normal operation an increase in the length of the actuator results in the attachment being lowered relative to the machine; and
   a second linkage group substantially similar to the first linkage group, the first and second linkage groups being connected via a support structure extending between the first and second linkage groups;
   wherein the attachment includes a foot plate with a rake angle that changes during raising and lowering, wherein the rake angle decreases during lowering of the attachment relative to the machine due to the kinematics of the linkage arrangement, and wherein the support structure includes at least first and second tubular elements extending between upper arms of the first and second linkage groups, and wherein two plate members are connected to the first and second tubular elements and the upper arms of the first and second linkage groups to form a box section.

* * * * *